US012742751B2

(12) United States Patent
Rao et al.

(10) Patent No.: US 12,742,751 B2
(45) Date of Patent: Sep. 22, 2026

(54) ULTRASONIC NON-DESTRUCTIVE TESTING METHOD AND SYSTEM FOR LITHIUM PRECIPITATION IN LITHIUM-ION BATTERY

(71) Applicants: BEIHANG UNIVERSITY, Beijing (CN); Shandong Nonmetallic Materials Institute, Jinan (CN)

(72) Inventors: Jing Rao, Beijing (CN); Yan Sun, Jinan (CN); Jian Duan, Jinan (CN); Lijun Xu, Beijing (CN)

(73) Assignees: BEIHANG UNIVERSITY, Beijing (CN); Shandong Nonmetallic Materials Institute, Jinan (CN)

( * ) Notice: Subject to any disclaimer, the term of this patent is extended or adjusted under 35 U.S.C. 154(b) by 477 days.

(21) Appl. No.: 18/530,260

(22) Filed: Dec. 6, 2023

(65) Prior Publication Data

US 2025/0003928 A1 Jan. 2, 2025

(30) Foreign Application Priority Data

Jun. 30, 2023 (CN) ........................ 202310797031.3

(51) Int. Cl.
*G01N 29/44* (2006.01)

(52) U.S. Cl.
CPC ..... *G01N 29/4418* (2013.01); *G01N 29/4463* (2013.01)

(58) Field of Classification Search
None
See application file for complete search history.

(56) References Cited

U.S. PATENT DOCUMENTS 8,680,815 B2 * 3/2014 Wang ................... G01R 31/392 320/132
8,909,492 B2 * 12/2014 McKeon ............ G01N 29/4472 702/66
11,211,807 B1 * 12/2021 Bailey ........................ H02J 7/50
11,422,194 B2 * 8/2022 Oyama ................ G01R 31/388
12,315,880 B2 * 5/2025 Li ..................... H01M 10/0567
2007/0172723 A1 * 7/2007 Chen ................... H01M 10/482 429/61
2009/0153101 A1 * 6/2009 Meyer ..................... H02J 7/485 320/119
2019/0064276 A1 * 2/2019 Kawai .................. G01R 31/367

* cited by examiner

*Primary Examiner* — Maikhanh Nguyen
(74) *Attorney, Agent, or Firm* — Bayramoglu Law Offices LLC

(57) ABSTRACT

An ultrasonic non-destructive testing method and system for detecting lithium precipitation in lithium-ion batteries are provided. The method includes the following steps: acquiring full matrix capture data of the lithium-ion battery using an ultrasonic phased array transducer; inputting the measured ultrasonic data into the initial fully convolutional network (FCN), which outputs a predicted ultrasonic velocity model; using the predicted model as the initial input for an acoustic wave equation that outputs reconstructed ultrasonic data; constructing a loss function using the deviation between the measured and reconstructed ultrasonic data, and iterating until the loss function converges. This process completes the training of the unsupervised FCN. The trained FCN then outputs an accurate reconstructed ultrasonic velocity model that represents the lithium precipitation in the battery.

5 Claims, 2 Drawing Sheets

| | | | |
|---|---|---|---|
| $S_{11}$ | $S_{12}$ | $S_{13}$ | $S_{14}$ |
| $S_{21}$ | $S_{22}$ | $S_{23}$ | $S_{24}$ |
| $S_{31}$ | $S_{32}$ | $S_{33}$ | $S_{34}$ |
| $S_{41}$ | $S_{42}$ | $S_{43}$ | $S_{44}$ |

FIG. 2

ULTRASONIC NON-DESTRUCTIVE TESTING METHOD AND SYSTEM FOR LITHIUM PRECIPITATION IN LITHIUM-ION BATTERY

CROSS-REFERENCE TO THE RELATED APPLICATIONS

This application is based upon and claims priority to Chinese Patent Application No. 202310797031.3, filed on Jun. 30, 2023, the entire contents of which are incorporated herein by reference.

TECHNICAL FIELD

The present disclosure relates to the field of lithium-ion battery testing technology, and in particular, relates to an ultrasonic non-destructive testing method and system for detecting lithium precipitation in lithium-ion batteries.

BACKGROUND

The statement herein is provided only for introducing the background art relevant to the present disclosure, not necessarily constituting the prior art.

With the rapid development of the economy, the problem of resource shortage is becoming more and more serious, and various new energy sources, power batteries and energy storage systems are needed to be developed urgently. As a rechargeable battery, the lithium-ion battery has advantages such as high energy density, high output voltage, good cycling performance and low self-discharge rate. It is a secondary battery and chemical energy storage power source with great application prospects, widely used in many fields such as electric vehicles, aerospace and energy storage systems. However, the lithium-ion batteries are prone to lithium precipitation issues during the charging process, especially under conditions at low temperatures, fast charging (i.e., high rate charging), and overcharging. The lithium precipitation in lithium-ion batteries refers to an abnormal phenomenon where, during the charging process, lithium ions do not intercalate into the negative electrode material but are instead deposited on the surface of the negative electrode in the form of metallic lithium. The metal lithium deposited during lithium plating typically does not form a smooth coating but exists in the form of dendritic crystals, known as lithium dendrites. Excessive growth of these dendrites can penetrate the separator, leading to a short circuit between the anode and cathode, and may even cause the lithium-ion battery to catch fire or explode. Extensive studies on the failure mechanism of the lithium-ion batteries show that the lithium precipitation is an important reason causing the capacity degradation of the lithium-ion battery, and even an internal short circuit that leads to thermal runaway. Therefore, conducting the lithium precipitation detection in lithium-ion batteries is of great importance.

At present, the conventional methods for analyzing the mechanism and causative factors of lithium precipitation in lithium-ion batteries primarily involve battery disassembly and microscopic characterization. However, since the lithium-ion batteries typically have a sealed exterior, these methods of lithium precipitation testing disrupt the originally enclosed system within the battery, causing changes to internal information and significantly affecting the accuracy of the analysis. For this reason, various non-destructive testing methods (NDT), such as those that detect changes in the physical properties of a cell caused by lithium, have been proposed.

The ultrasonic NDT method offers advantages such as strong universality and high accuracy. It is sensitive to changes in the material properties of a structure. Variations in the mechanical properties (e.g., density and Young's modulus) of the electrode during the battery charging and discharging process can affect the ultrasonic wave propagation within the battery. Therefore, analyzing ultrasonic characteristics can realize the non-destructive evaluation of lithium-ion batteries. However, the existing ultrasonic NDT methods for detecting lithium-ion batteries mainly rely on ultrasonic time-of-flight (TOF) for analysis, which ignores diffraction at defects (i.e., lithium precipitation). The method can be only used for testing in the case that the defect size is much larger than the incident ultrasound wavelength. In other words, conventional ultrasonic testing methods are suitable only for detecting lithium precipitation with larger sizes and suffer from low detection accuracy.

SUMMARY

To solve the deficiencies of the above existing art, the present disclosure provides an ultrasonic NDT method and system for detecting lithium precipitation in lithium-ion batteries, which considers higher order diffraction and scattering at defects, and realizes high-resolution non-destructive evaluation of lithium precipitation in lithium-ion batteries using an unsupervised deep learning method based on a physical model.

In a first aspect, the present disclosure provides an ultrasonic NDT method for detecting lithium precipitation in a lithium-ion battery.

An ultrasonic NDT method for detecting lithium precipitation in the lithium-ion battery includes:

- acquiring full matrix capture (FMC) data of the lithium-ion battery utilizing an ultrasonic phased array transducer;
- inputting the measured FMC data into an initial fully convolutional network (FCN) to output a predicted ultrasonic velocity model;
- inputting the predicted ultrasonic velocity model as an initial model into an acoustic wave equation, which outputs reconstructed ultrasonic data;
- constructing a loss function based on the discrepancy between the measured FMC data and the reconstructed ultrasonic data, and performing iterations until the loss function converges, so that the training of the unsupervised FCN is completed; and
- the trained FCN finally outputs an accurate predicted ultrasonic velocity model, which is indicative of lithium precipitation in the lithium-ion battery.

In a second aspect, the present disclosure provides an ultrasonic NDT system for detecting lithium precipitation in a lithium-ion battery.

An ultrasonic NDT system for detecting lithium precipitation in the lithium-ion battery includes:

- a data acquisition module, configured to acquire FMC data of the lithium-ion battery utilizing the ultrasonic phased array transducer;
- an unsupervised FCN training module, configured to input the measured ultrasonic data into an initial FCN to output the predicted ultrasonic velocity model; input the predicted ultrasonic velocity model as the initial model into an acoustic wave equation to output reconstructed ultrasonic data; and construct a loss function utilizing the deviation between the measured ultrasonic data and the reconstructed ultrasonic data, and perform iterations until the loss function converges, so that the training of unsupervised FCN is completed; and a lithium precipitation testing result output module, configured for the trained FCN to finally output the accurate predicted ultrasonic velocity model, wherein the lithium precipitation manifests as variations in ultrasonic velocity, distinct from the background ultrasonic velocity, making them detectable through ultrasonic wave measurement analysis.

In a third aspect, the present disclosure further provides an electronic device, including a memory and a processor with computer instructions stored in the memory and run on the processor, wherein when the processor runs the computer instructions, the steps of the method described in the first aspect are completed.

In a fourth aspect, the present disclosure further provides a computer readable storage medium configured to store the computer instructions, wherein when the processor runs the computer instructions, the steps of the method described in the first aspect are completed.

One or more of the above technical solutions have the following beneficial effects.

1. The present disclosure provides an ultrasonic NDT method and system for detecting lithium precipitation in a lithium-ion battery, wherein based on the measured FMC data, the accurate predicted ultrasonic velocity model is output through the unsupervised deep learning method based on the physical model (i.e., acoustic wave equation), and the predicted ultrasonic velocity model can characterize the lithium precipitation, thereby realizing the high-resolution quantitative evaluation of lithium precipitation in the lithium-ion battery.

2. The unsupervised FCN is adopted in the testing method provided by the present disclosure, wherein compared with the ultrasonic testing method based on the supervised learning, in the method of the present disclosure, this does not necessitate a large number of training sets and a matching relationship between the real ultrasonic velocity model and the corresponding measured ultrasonic data used in the training sets, and therefore this method provided by the present disclosure can effectively improve the testing efficiency.

BRIEF DESCRIPTION OF THE DRAWINGS

The drawings that constitute a part of the present disclosure are used to provide a further understanding on the present disclosure. The exemplary embodiments of the present disclosure and the illustrations thereof are used to explain the present disclosure, and would not limit the present disclosure improperly.

FIG. 2 shows a schematic diagram of the measured FMC data in the embodiments of the present disclosure.

DETAILED DESCRIPTION OF THE EMBODIMENTS

Figure 1:
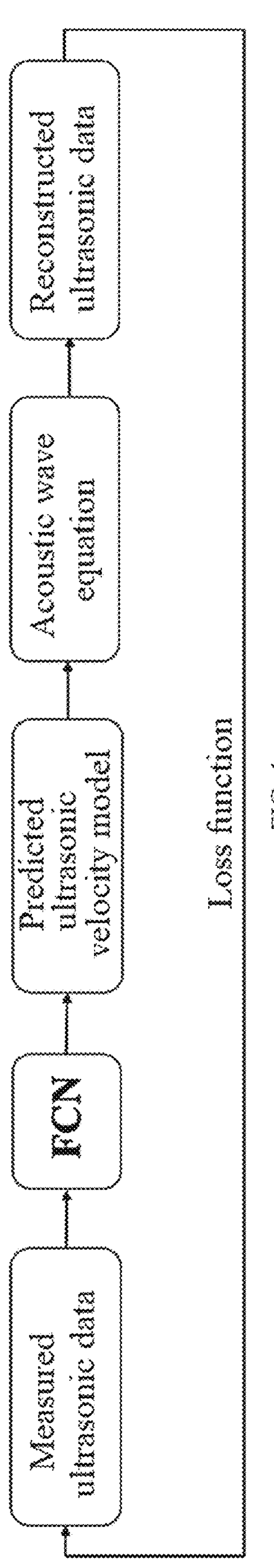
FIG. 1 shows a flowchart of the ultrasonic NDT method for detecting lithium precipitation in the lithium-ion battery in the embodiments of the present disclosure.

It should be noted that the following detailed descriptions are all exemplary, and are intended to provide further illustrations of the present disclosure. Unless otherwise indicated, all technical and terminologies used herein have the same meaning as commonly understood by ordinarily skilled in the field of the present disclosure.

It should be noted that, the terminologies used herein are intended only to describe specific embodiments, and are not intended to limit the exemplary embodiments according to the present disclosure. As used herein, unless the context clearly indicates otherwise, the singular form is intended to include the plural form as well, and in addition, it should also be understood that when the terms, "comprising" and/or "including", are used in the specification, it indicates the presence of a feature, a step, an operation, a device, a component, and/or a combination thereof.

Embodiment 1

The present embodiment introduces an ultrasonic NDT method for detecting lithium precipitation in lithium-ion batteries. This method utilizes the ultrasonic full waveform, including high-order diffraction and scattering where lithium metal precipitates and gas is released from reactions with the electrolyte. By integrating deep learning algorithms, it achieves high-resolution, quantitative analysis and evaluation of lithium precipitation within the battery. Specifically, during the charging process of the lithium-ion battery, the ultrasonic phased array transducer is used to acquire the FMC data, i.e., measured ultrasonic data, which is inputted into the initial unsupervised FCN, so as to output the predicted ultrasonic velocity model. The predicted ultrasonic velocity model as an initial model is then inputted into the acoustic wave equation to generate the reconstructed ultrasonic data, so as to construct the loss function using the differences between the FMC data (i.e., measured ultrasonic data) and the reconstructed ultrasonic data. The above process is iterated until the loss function converges, such that the FCN training is completed. When the training of the unsupervised FCN is completed, the FCN finally outputs the accurate predicted ultrasonic velocity model, effectively identifying and characterizing lithium defects. With the above technical solutions, the present embodiment can realize high-resolution and high-precision testing for detecting the lithium precipitation in the lithium-ion battery.

The ultrasonic NDT method for detecting lithium precipitation in the lithium-ion battery provided in the present embodiment, as shown in FIG. 1, specifically includes the following steps:

acquiring FMC data of a lithium-ion battery utilizing an ultrasonic phased array transducer;

inputting the measured FMC data into the initial FCN to output the predicted ultrasonic velocity model;

inputting the predicted ultrasonic velocity model as an initial model into an acoustic wave equation, which outputs the reconstructed ultrasonic data;

constructing a loss function based on the discrepancy between the measured ultrasonic data and the reconstructed ultrasonic data, and performing iterations until the loss function converges, so that the training of the unsupervised FCN is completed; and the trained FCN finally outputs the accurate predicted ultrasonic velocity model, which is indicative of lithium precipitation in the lithium-ion battery.

The unsupervised FCN is trained without a large numbers of training sets, wherein the physical model (i.e., the acoustic wave equation) and the ultrasonic FMC data are combined to realize the mining of intrinsic features. Compared to the situation that a large number of the training sets are needed for the supervised learning, the present embodiment can improve the testing efficiency through the unsupervised deep learning. That is, unlike the conventional ultrasonic testing method based on the supervised learning, the method described in the embodiment does not require a large number of training sets and the matching relationship between the real ultrasonic velocity model and the corresponding measured ultrasonic data required in the training sets, and thus the method of the embodiment can realize an improvement of testing efficiency. As shown in FIG. 1, the training process of the described unsupervised FCN based on the physical model specifically includes the following steps:

Step S1: in a state of the lithium-ion battery is being charged, first, the ultrasonic phased array transducer is used to acquire the FMC data, i.e., measured ultrasonic data. In fact, ultrasonic NDT can be performed irrespective of the battery's state of charge. In the present embodiment, the illustration is made with the ultrasonic NDT of the lithium-ion battery in the charging state taken as an example. The FMC is a specific data acquisition process which is performed utilizing the ultrasonic phased array transducer. As for an array probe with N elements, the individual elements are excited sequentially, and at the same time, all the elements receive signals. The signal data are organized into a matrix S containing all the acquired signals. As shown in FIG. 2, $S_{ij}$ represents the signal emitted by element i, which is measured by element j.

It is preferable to perform data processing on the acquired FMC data; for instance, noise reduction processing can be applied to enhance the signal-to-noise ratio.

Step S2: the unsupervised FCN is constructed and the measured ultrasonic data are input into the initial FCN, and the predicted ultrasonic velocity model is output. Specifically, the FCN mainly includes a convolutional layer, an upsampling layer and a skip layer. A non-linear mapping from the measured ultrasonic data (input) to the predicted ultrasonic velocity model (output, which characterizes the lithium precipitation) is realized through the FCN. The mathematical expression of the process is as follows:

$$d=\mathrm{FCN}(\tilde{v}),$$

where d represents the measured ultrasonic data, FCN denotes the fully convolutional network, and $\tilde{v}$ represents the predicted ultrasonic velocity model obtained from the FCN.

In fact, the predicted ultrasonic velocity model quantitatively characterizes the lithium precipitation, which utilizes a fact that the ultrasonic velocity at the defect (i.e., lithium precipitation) is obviously different from the ultrasonic velocity of the lithium-ion battery itself.

Step S3: the predicted ultrasonic velocity model obtained from the above step S2, serving as the initial model, is input into the acoustic wave equation to output the reconstructed ultrasonic data. Specifically, the data expression for this process is as follows:

$$\tilde{v}=f^{-1}(\tilde{d}),$$

where $f^{-1}$ represents a forward operator in the acoustic wave equation, and $\tilde{d}$ represents the reconstructed ultrasonic data.

The aforementioned acoustic wave equation, a standard in this field, originates from Maxwell's equations and comprises a set of differential equations that describe the behavior of electromagnetic wave fields. This equation is employed to depict various natural wave phenomena, such as sound and water waves. By reconstructing the sound velocity data, a more accurate initial model can be provided for the acoustic wave equation. Essentially, this is an inversion problem, wherein if the provided initial model is not good enough, a satisfactory solution to the acoustic wave equation cannot be achieved.

Step S4: the loss function is constructed by utilizing the discrepancy between the measured ultrasonic data and the reconstructed ultrasonic data, and iterations are performed until the loss function converges, so that the training of the unsupervised FCN is completed. Specifically, the loss function L is utilized as a criterion for the deviation between the measured ultrasonic data d and the reconstructed ultrasonic data $\tilde{d}$ to achieve the high-precision testing of the lithium precipitation. The loss function L consists of two parts: the pixel-wise loss $L_{pw}$ and the perceptual loss $L_{pl}$, as detailed below:

$$L(d,\tilde{d})=L_{pw}(d,\tilde{d})+L_{pl}(d,\tilde{d}),$$

A definition of the above pixel-wise loss $L_{pw}$ is given by:

$$L_{pw}(d,\tilde{d})=\lambda_1 L_1(d,\tilde{d})+\lambda_2 L_2(d,\tilde{d}),$$

where $\lambda_1$ and $\lambda_2$ denote two hyperparameters to control the relative importance; $L_1$ and $L_2$ represent the $L_1$ norm and the $L_2$ norm, respectively.

The definition of the above perceptual loss $L_p$ is expressed as:

$$L_{pl}(d,\tilde{d})=\lambda_3 L_1(\phi(d),\phi(\tilde{d}))+\lambda_4 L_2(\phi(d),\phi(\tilde{d})),$$

where $\lambda_3$ and $\lambda_4$ denote the two hyperparameters; and Ø represents the network architecture parameters in the FCN. The perceptual loss may capture the regional structures better compared with the pixel-wise loss.

Finally, when completing the training of the unsupervised FCN, the network ultimately outputs the accurate predicted ultrasonic velocity model, which can characterize the lithium precipitation, thereby yielding the testing results for lithium precipitation in the lithium-ion battery.

In the method described above in the embodiment, the full waveform information is considered, including ultrasonic diffraction and multiple scattering at the site of lithium precipitation. This information, in conjunction with a deep learning algorithm, enables the training of an unsupervised FCN based on the acoustic wave equation. The process yields an accurate predicted ultrasonic velocity model for the lithium-ion battery. Consequently, this model facilitates high-resolution reconstruction of lithium precipitation within the battery.

Embodiment 2

The present embodiment provides an ultrasonic NDT system for detecting the lithium precipitation in the lithium-ion battery, including:

a data acquisition module, configured to acquire the measured FMC data of the lithium-ion battery utilizing the ultrasonic phased array transducer;

an unsupervised FCN training module, configured to input measured ultrasonic data into the initial FCN to output a predicted ultrasonic velocity model; input the predicted ultrasonic velocity model as the initial model into an acoustic wave equation, which outputs reconstructed ultrasonic data; and construct a loss function based on the discrepancy between the measured ultrasonic data and the reconstructed ultrasonic data, and perform iterations until the loss function converges, so that training of the unsupervised FCN is completed; and a lithium precipitation testing result output module, configured for the trained FCN to finally output the accurate predicted ultrasonic velocity model, which is indicative of lithium precipitation in the lithium-ion battery.

Embodiment 3

The embodiment provides an electronic device, including a memory and a processor with computer instructions stored in the memory and running on the processor, wherein when the computer instructions are run by the processor, the steps in the ultrasonic NDT method for detecting lithium precipitation in the lithium-ion battery as described above are performed.

Embodiment 4

The embodiment further provides a computer readable storage medium configured to store computer instructions. When the computer instructions are executed by the processor, the steps in the ultrasonic NDT method for detecting lithium precipitation in the lithium-ion battery as described above are performed.

The individual steps involved in Embodiments 2 to 4 above are corresponding to the Embodiment 1 which is a method embodiment. The specific implementation may be obtained by referring to the relevant description section in Embodiment 1. The terminology, "computer readable storage medium" should be understood as a single medium or a plurality of media including one or more instruction sets. It should be also understood as including any medium, wherein the any medium can store, encode or carry the instruction sets to be executed by the processor, and enables the processor to perform any of the methods in the present disclosure.

It should be understood by those skilled in the art that, the individual modules or steps of the present disclosure described above may be realized by a general purpose computer device. Optionally, they may be realized by program codes executable by a computing device, and thereby, they can be stored in the storage device to be executed by the computing device, or they may be separately made of individual integrated circuit modules, or multiple modules or steps of them may be made as a single integrated circuit module. The present disclosure is not limited to any specific combination of the hardware and software.

Only preferred embodiments of the present disclosure are mentioned above and not intended to limit the present disclosure. The present disclosure may have various changes and variations for those skilled in the art. Any modifications, equivalent substitutions, improvements, etc. made within the spirit and principles of the present disclosure shall be included in the scope of protection of the present disclosure.

Although the embodiments of the present disclosure are described in conjunction with the drawings, it is not a limitation on the scope of protection of the present disclosure. The persons skilled in the art should understand that, based the technical solutions of the present disclosure, the persons skilled in the art can make various modifications or deformations without any creative labors, which are still within the scope of protection of the present disclosure.

What is claimed is:

1. An ultrasonic non-destructive testing (NDT) method for detecting lithium precipitation in a lithium-ion battery, comprising:

acquiring measured full matrix capture (FMC) data of the lithium-ion battery utilizing an ultrasonic phased array transducer;

inputting the measured FMC data into an initial fully convolutional network (FCN) to output a predicted ultrasonic velocity model;

inputting the predicted ultrasonic velocity model as an initial model into an acoustic wave equation, the acoustic wave equation outputs reconstructed ultrasonic data;

constructing a loss function based on a discrepancy between measured ultrasonic data and the reconstructed ultrasonic data, and performing iterations until the loss function converges, wherein training of an unsupervised FCN is completed to obtain a trained FCN; and the trained FCN outputting an accurate predicted ultrasonic velocity model, wherein the accurate predicted ultrasonic velocity model is indicative of the lithium precipitation in the lithium-ion battery, wherein the loss function comprises a pixel-wise loss and a perceptual loss, wherein the pixel-wise loss ($L_{pw}$) is expressed as:

$$L_{pw}(d, \tilde{d}) = \lambda_1 L_1(d, \tilde{d}) + \lambda_2 L_2(d, \tilde{d}),$$

wherein $\lambda_1$ and $\lambda_2$ denote two hyperparameters, $L_1$ and $L_2$ represent $L_1$ norm and $L_2$ norm, respectively, d represents the measured ultrasonic data, and $\tilde{d}$ represents the reconstructed ultrasonic data, wherein the perceptual loss $L_{pl}$ is given by:

$$L_{pl}(d, \tilde{d}) = \lambda_3 L_1(\phi(d), \phi(\tilde{d})) + \lambda_4 L_2(\phi(d), \phi(\tilde{d})),$$

where $\lambda_3$ and $\lambda_4$ denote two hyperparameters and Ø represents a network architecture parameter of the FCN.

2. The ultrasonic NDT method for detecting the lithium precipitation in the lithium-ion battery according to claim 1, wherein the acquired measured FMC data comprises the measured ultrasonic data and is subjected to a data processing, and the data processing comprises a noise reduction processing.

3. The ultrasonic NDT method for detecting the lithium precipitation in the lithium-ion battery according to claim 1, wherein the FCN is employed to establish a mapping relationship between the measured ultrasonic data and the predicted ultrasonic velocity model, as defined by the following equation:

$$d=\text{FCN}(\tilde{v}),$$

wherein d represents the measured ultrasonic data, and ~ represents the predicted ultrasonic velocity model obtained from the FCN.

4. An ultrasonic non-destructive testing (NDT) system for detecting lithium precipitation in a lithium-ion battery, comprising:

one or more processors;

a data acquisition module, executed by the one or more processors to acquire full matrix capture (FMC) data of the lithium-ion battery utilizing an ultrasonic phased array transducer;

an unsupervised fully convolutional network (FCN) training module, executed by the one or more processors to input measured ultrasonic data into an initial FCN and output a predicted ultrasonic velocity model; input the predicted ultrasonic velocity model as an initial model into an acoustic wave equation, and output reconstructed ultrasonic data; and construct a loss function by utilizing a deviation between measured ultrasonic data and the reconstructed ultrasonic data, and perform iterations until the loss function converges, wherein training of an unsupervised FCN is completed to obtain a trained FCN; and a lithium precipitation testing result output module, executed by the one or more processors for, by the trained FCN, outputting an accurate predicted ultrasonic velocity model, wherein lithium precipitation defects manifest as variations in ultrasonic velocity, distinct from background ultrasonic velocity, making them detectable through ultrasonic wave measurement analysis, wherein the loss function comprises a pixel-wise loss and a perceptual loss, wherein the pixel-wise loss ($L_{pw}$) is expressed as:

$$L_{pw}(d, \tilde{d}) = \lambda_1 L_1(d, \tilde{d}) + \lambda_2 L_2(d, \tilde{d}),$$

wherein $\lambda_1$ and $\lambda_2$ denote two hyperparameters, $L_1$ and $L_2$ represent $L_1$ norm and $L_2$ norm, respectively, d represents the measured ultrasonic data, and $\tilde{d}$ represents the reconstructed ultrasonic data, wherein the perceptual loss ($L_{pl}$) is given by:

$$L_{pl}(d, \tilde{d}) = \lambda_3 L_1(\phi(d), \phi(\tilde{d})) + \lambda_4 L_2(\phi(d), \phi(\tilde{d})),$$

where $\lambda_3$ and $\lambda_4$ denote two hyperparameters and Ø represents a network architecture parameter of the FCN.

5. An electronic device, wherein the electronic device comprises a memory and a processor with computer instructions stored in the memory and run on the processor, wherein when the computer instructions are run by the processor, steps of the ultrasonic NDT method for detecting the lithium precipitation in the lithium-ion battery according to claim 1 are performed.

* * * * *